B. G. PATTERSON.
ENGINE STARTER.
APPLICATION FILED MAR. 17, 1913.
1,096,748.
Patented May 12, 1914.
2 SHEETS—SHEET 1.
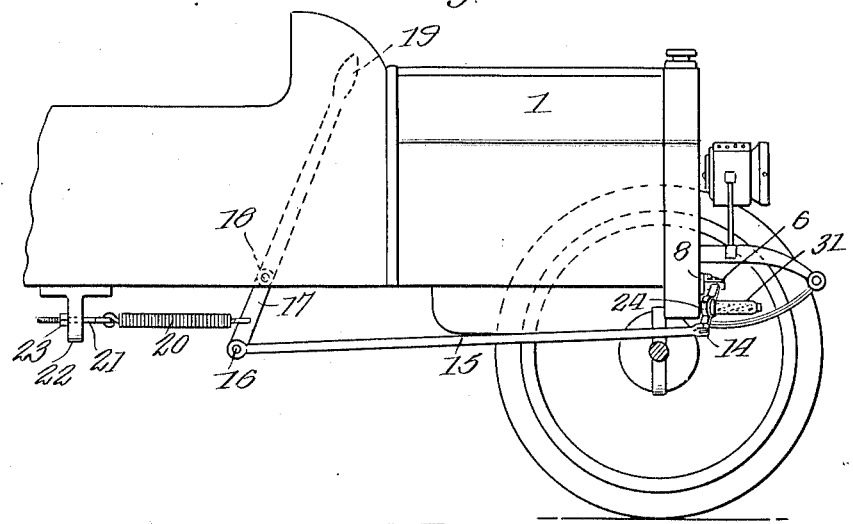
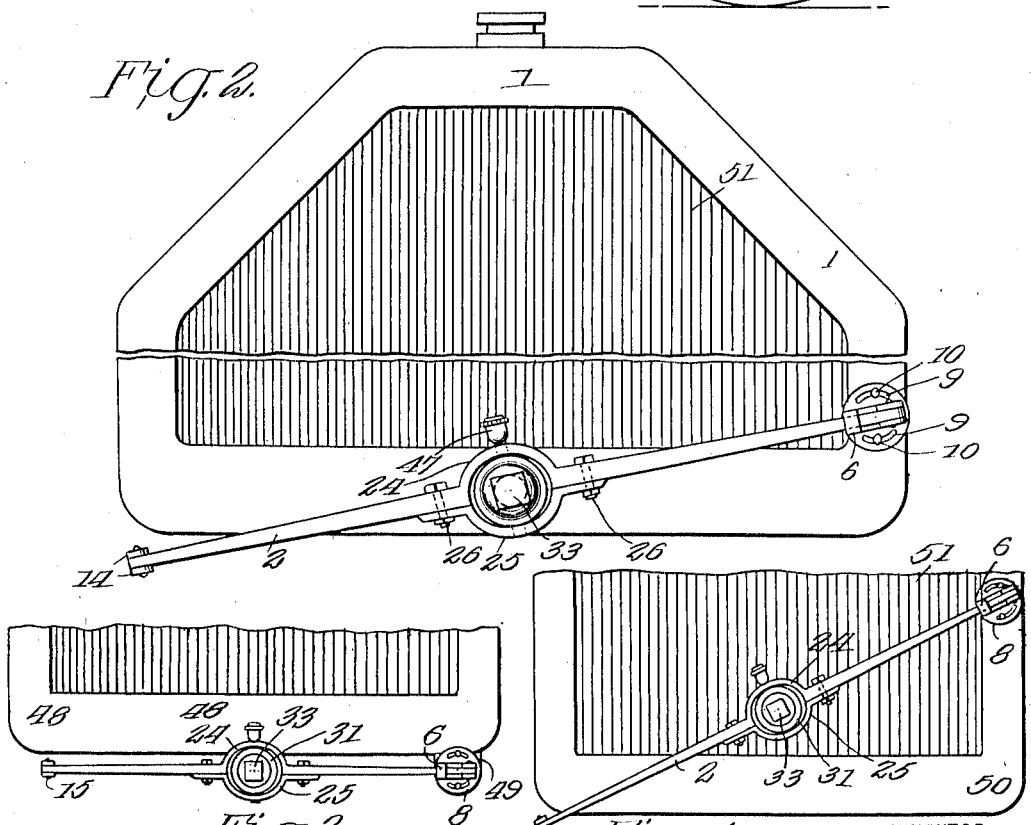
WITNESSES
Samuel E. Wade
C. L. Tranor
INVENTOR
BENJAMIN G. PATTERSON
BY Munn & Co.
ATTORNEYS

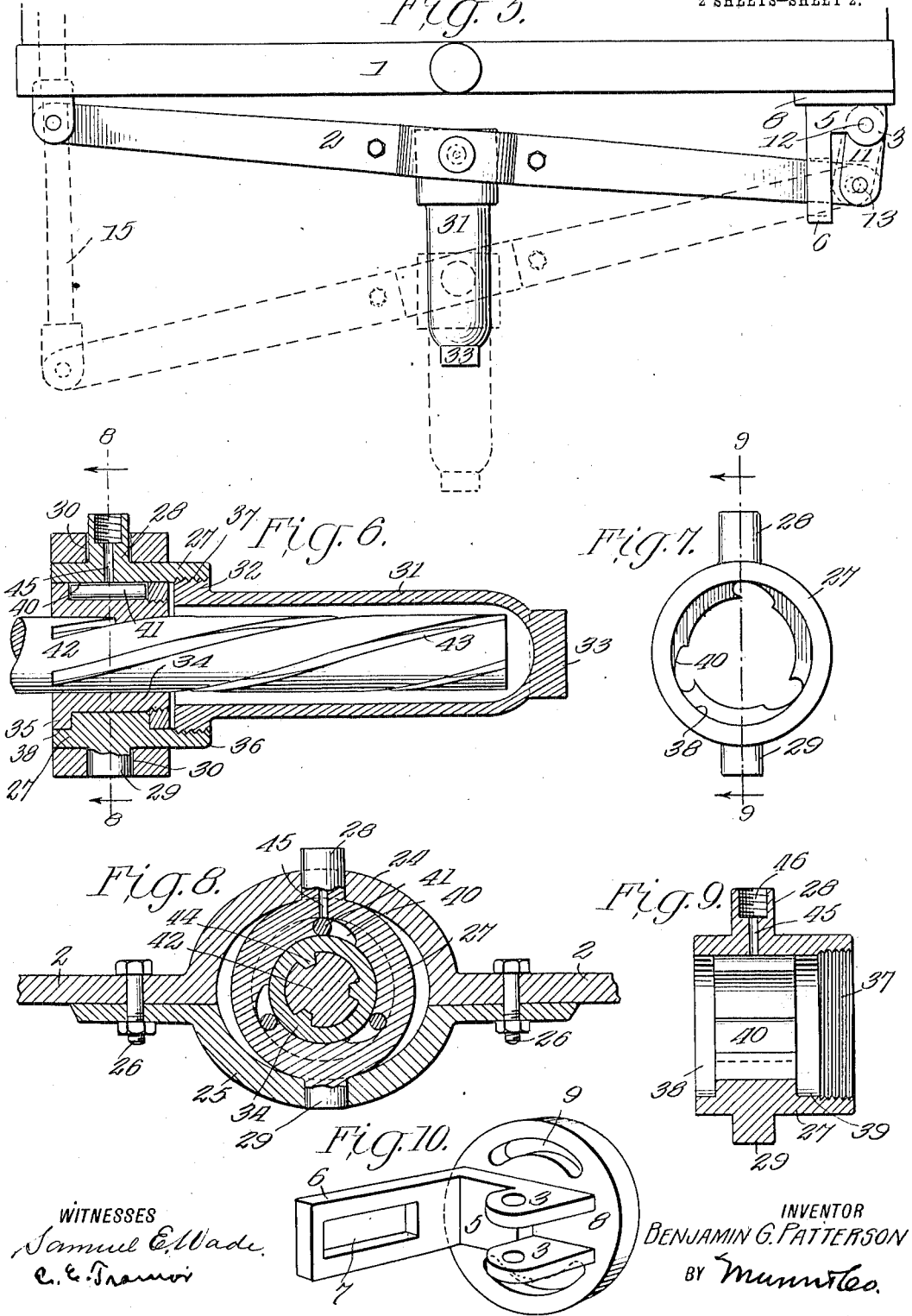

UNITED STATES PATENT OFFICE.

BENJAMIN G. PATTERSON, OF OKLAHOMA, OKLAHOMA, ASSIGNOR TO THE PATTERSON-CLARK COMPANY, OF OKLAHOMA, OKLAHOMA, A CORPORATION OF OKLAHOMA.

ENGINE-STARTER.

1,096,748.   Specification of Letters Patent.   Patented May 12, 1914.

Application filed March 17, 1913. Serial No. 754,746.

*To all whom it may concern:*

Be it known that I, BENJAMIN G. PATTERSON, a citizen of the United States, and a resident of Oklahoma city, in the county of Oklahoma and State of Oklahoma, have invented a new and useful Improvement in Engine-Starters, of which the following is a specification.

My invention is an improvement in engine starters, and has for its object to provide mechanism of the character specified for connection with the engine shaft to permit the said shaft to be rotated by the driver without dismounting, and from his usual seat, and wherein means is provided for disconnecting the said mechanism from the engine shaft when the engine is running.

In the drawings: Figure 1 is a side view of a portion of an automobile provided with the improvement, Fig. 2 is a front view of the hood of the automobile with the attachment in place, Figs. 3 and 4 are similar views showing other arrangements for different mountings of engines, Fig. 5 is a plan view of the starting mechanism, Fig. 6 is a longitudinal vertical section of the shaft engaging means, Fig. 7 is a rear view of the sleeve, Fig. 8 is a section on the line 8—8 of Fig. 6, looking in the direction of the arrows, Fig. 9 is a section on the line 9—9 of Fig. 7, looking in the direction of the arrows, and Fig. 10 is a perspective view of the connecting means for the lever.

The present embodiment of the invention is shown in connection with the engine of an automobile 1, and the said mechanism comprises a lever 2, having one of its ends connected on a pair of lugs 3, on one of the arms 5 of an angle plate, whose other arm 6 is provided with a rectangular opening 7, and the said arm 5 of the angle plate is secured to a circular plate 8, the said plate having oppositely arranged arc-shaped slots 9, for receiving screws or bolts 10, to secure the said plate to the radiator of the automobile, at one side of the said radiator. The lever end passes through the opening 7 of the arm 6, and is connected to the lugs by means of a link 11, one end of the link being received between the lugs and pivoted thereto by means of a pin or bolt 12, while the other end is pivoted to the lever by means of a rivet or bolt 13. The lever extends transversely of the front of the radiator as shown in Fig. 2, and the opposite end of the lever is received between spaced lugs 14 on the one end of a link 15, whose other end is pivoted at 16 to the lower end of a lever 17. The lever 17 is pivoted at 18 to the body of the automobile, adjacent to the driver, the upper end having a grip 19, which is in position to grasp by the driver to operate the starting mechanism. The lever passes through an opening in the floor or bottom of the body, and a coil spring 20 has one of its ends connected with the lever below the pivot and the other end connected with a threaded rod 21, which passes through an opening in a bracket 22, secured to the body, and the rod is engaged by a nut 23 on the opposite side of the bracket.

By means of the nut, the tension of the spring 20 may be varied to meet conditions, and the said spring normally holds the lever in the position of Fig. 1, that is, in such position that when the grip is moved rearwardly or toward the operator, the parts will be in position to start the engine. When the lever 17 is so moved, the end of the lever 2 remote from the plate 8 is moved away from the front of the radiator as shown in Fig. 5, the lever swinging on the link 11, and the movement of the lever is limited by the opening 7 of the arm 6 of the angle plate.

The lever 2 is provided intermediate its ends with a lateral bend, forming one section 24 of a ring, the other section being formed by a clip 25, secured to the lever by means of bolts and nuts 26. The lateral bend and the clip form a circular ring at the center of the lever, and a sleeve 27 is connected to the ring, by means of trunnions or journal pins 28 and 29 on the sleeve and arranged at diametrical points, the said trunnions or journal pins passing through oppositely arranged openings 30 in the ring.

The outer end of the sleeve 27 is internally threaded as shown at 37, and a protector thimble or casing 31 has an annular externally threaded enlargement 32 at one end which is received within the sleeve as shown in Fig. 6. The outer end of the protector is closed as indicated at 33, and the said closure is polygonal in cross section to receive a wrench or the like for permitting the removal of the protector. A sleeve nut 34 is arranged within the sleeve 27, the said sleeve nut having an annular marginal flange 35 at one end, which is received within a rabbet 38 in the inner end of the sleeve 27, and the opposite end of the sleeve nut has a ring 36 threaded thereon, the ring being received in a rabbet 39 at the opposite end of the sleeve 27.

The internally threaded portion 37 of the sleeve 27 is within the rabbeted portion 39, the threads being cut in the said portion so that when the protector 31 is removed, access may be had to the ring 36 to remove the said ring to permit the removal of the sleeve nut 34. That portion of the internal surface of the sleeve nut between the rabbets 38 and 39 is provided with three grooves or recesses 40, each of the said grooves having one of its walls inclined, and a roller 41 is arranged in each of the said grooves or recesses. The grooves or recesses 40 are so shaped that when the sleeve nut 34 is rotated in one direction, the rollers 41 will bind between the bottom wall of the recess 40 and the periphery of the sleeve nut to prevent angular movement of the sleeve, while when the nut is rotating in the opposite direction, the rollers will roll into the deepest portion of the recess 40 to prevent binding on the sleeve.

The engine shaft 42 is provided on its periphery at the front end thereof with a plurality of spaced parallel spirally arranged grooves 43, and the inner surface of the sleeve nut 34 is provided with lugs 44, which engage the several grooves. When the thimble protector is in the normal inoperative position shown in full lines in Fig. 5, the outer end of the shaft is adjacent to the closed end of the protector, and the grooves 43 are of sufficient length to permit the shaft to occupy this position. The trunnion or journal pin 28 is provided with a vertical passage 45, and the outer end of the passage is enlarged and internally threaded as indicated at 46, for receiving an oil cup 47. The oil cup is threaded into the enlargement 46 and when the cup is filled with oil, it will be evident that the rollers 40 and the external surface of the sleeve nut and the internal surface of the sleeve 27, will be thoroughly lubricated to eliminate friction.

In operation, the parts normally occupy the position in full lines in Figs. 1 and 5. When the driver wishes to start the engine, he swings the upper end of the lever 17 toward the seat after arranging the fuel feed and igniting device in the proper position. This movement swings the lever into the dotted line position of Fig. 5, moving the sleeve nut to the outer end of the engine shaft. The spring 20 is of sufficient strength to return the lever 17 to its original position as shown in Fig. 1, thus moving the sleeve nut toward the front of the automobile, that is, returning the parts to the full line position of Fig. 5. Since the clutch connection between the sleeve 27 and the nut 34 prevents rearward movement of the said nut with respect to the said sleeve, the shaft 42 must be moved forwardly, thus turning over the engine and starting the same in a forward direction. The clutch connection between the nut 34 and the sleeve 27 permits the nut to rotate with respect to the sleeve, that is, permits the nut to hold its relative position with respect to the engine shaft during the forward moving of the nut. When, however, the nut is moved rearwardly, the rollers 41 move into the shallow portions of the grooves 40 and firmly lock the nut 34 to the sleeve 27. The position of the lever 2 will vary with different arrangements of engines as for instance, in the arrangement just described, the engine shaft is within the radiator, the said shaft extending through the front of the radiator near the lower edge thereof. In the construction of Fig. 3 the engine shaft is below the radiator 48 and in this arrangement the plate 8 is secured to a bracket 49, depending from the radiator. In the construction shown in Fig. 4, the engine shaft is above the frame 50 of the radiator, being arranged in the radiating part 51 thereof. With this construction the plate 8 is secured to the radiator at a higher point than in the construction of Fig. 2. Whatever the level of the engine shaft, the lever 2 is so arranged that that end thereof which is connected to the link 15 is at the lower left corner of the radiator, so that the operating lever 17 will be adjacent to the right hand of the driver. The connecting member shown in Fig. 10 permits this connection as clearly shown in Figs. 2 to 4 inclusive. By loosening the nuts 10, the plate 8 may be turned annularly to the proper position to bring the movable ends of the lever 2 at the point desired.

I claim:—

1. An engine starter, comprising in combination with the engine shaft provided with a plurality of spaced parallel spirally arranged grooves at its outer end, of a sleeve nut on the shaft provided with inwardly extending lugs engaging the grooves, a bearing sleeve in which the sleeve nut is journaled, said bearing sleeve being rabbeted or annularly enlarged at each of its ends, the sleeve nut having an annular flange for engaging one of the rabbeted ends, a locking ring threaded on to the other end of the sleeve nut and received in the other rabbeted end, a protector casing threaded into the outer end of the bearing sleeve and inclosing the outer end of the shaft, the outer end of the said casing being closed and of polygonal cross section, a clutch connection between the sleeve nut and the bearing sleeve for locking the sleeve nut to the bearing sleeve against rearward movement with respect to the bearing sleeve and for permitting forward movement of the sleeve nut, a lever having intermediate its ends a bearing ring provided with oppositely arranged openings, the bearing sleeve having oppositely arranged journal pins engaging the openings, one of the said journal pins having a longitudinal passage leading to the clutch and having its outer end enlarged to receive an oil cup, means for pivotally connecting one end of the lever to the frame of the automobile, means engaging the other end for moving the said end away from the automobile, and a spring for returning the lever to normal position.

2. An engine starter, comprising in combination with the engine shaft provided with a plurality of spaced parallel spirally arranged grooves at its outer end, of a sleeve nut on the shaft provided with inwardly extending lugs engaging the grooves, a bearing sleeve in which the sleeve nut is journaled, a protector casing threaded into the outer end of the bearing sleeve and inclosing the outer end of the shaft, the outer end of the said casing being closed and of polygonal cross section, a clutch connection between the sleeve nut and the bearing sleeve for locking the sleeve nut to the bearing sleeve against rearward movement with respect to the bearing sleeve and for permitting forward movement of the sleeve nut, a lever having intermediate its ends a bearing ring provided with oppositely arranged openings, the bearing sleeve having oppositely arranged journal pins engaging the openings, means for pivotally connecting one end of the lever to the frame of the automobile, means engaging the other end for moving the said end away from the automobile, and a spring for returning the lever to normal position to start the engine.

3. An engine starter, comprising in combination with the engine shaft provided with a plurality of spaced parallel spirally arranged grooves at its outer end, of a sleeve nut on the shaft provided with inwardly extending lugs engaging the grooves, a bearing sleeve in which the sleeve nut is journaled, a protector casing threaded into the outer end of the bearing sleeve and inclosing the outer end of the shaft, the outer end of the said sleeve being closed and having a polygonal portion, a lever having intermediate its ends a bearing ring, the bearing sleeve having oppositely arranged journal pins and the bearing rings having openings for receiving the pins, means for pivotally connecting one end of the lever to the frame of the automobile, means in connection with the sleeve nut and the bearing sleeve for preventing rearward movement of the sleeve nut with respect to the bearing sleeve and for permitting forward movement, means engaging the other end for moving the said end away from the automobile, and a spring for returning the lever to its original position.

4. An engine starter, comprising in combination with the engine shaft having spaced parallel spirally arranged grooves, of a sleeve nut slidable longitudinally of the shaft and having inwardly extending lugs engaging the grooves, a bearing sleeve in which the sleeve nut is journaled, means for locking the sleeve nut from movement rearwardly and for permitting forward movement of the sleeve nut with respect to the bearing sleeve, a lever, means at one end of the lever for connecting the said end to an automobile to permit the other end of the lever to swing toward and from the automobile, a connection between the lever and the bearing sleeve for permitting the bearing sleeve to swing on a vertical axis, means for moving the free end of the lever away from the automobile, and means for returning the said lever to its normal position, and a protector casing for the end of the engine shaft, said casing being connected to the bearing sleeve and inclosing the shaft.

BENJAMIN G. PATTERSON.

Witnesses:
J. D. Deu Pree,
W. L. Patterson.